(12) United States Patent
Hayes, Jr. et al.

(10) Patent No.: US 6,295,448 B1
(45) Date of Patent: Sep. 25, 2001

(54) SHORT DISTANCE COMMUNICATION AND REMOTE CONTROL CAPABILITY FOR MOBILE TELEPHONES

(75) Inventors: John Joseph Hayes, Jr., Wake Forest; Ted Gilbert Ericsson, Cary, both of NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/158,025

(22) Filed: Sep. 21, 1998

(51) Int. Cl.[7] .............................. H04M 3/00; H04Q 7/20; G08C 19/00
(52) U.S. Cl. ..................... 455/420; 455/454; 455/556; 340/825.72
(58) Field of Search ..................................... 455/375, 403, 455/414, 462, 415, 420, 450, 454, 550, 552, 553, 556, 151.4; 379/110.01, 38, 102.03, 56.3, 355, 142, 93.23; 240/825.69, 825.72

(56) References Cited

U.S. PATENT DOCUMENTS

| | | |
|---|---|---|
| 3,337,992 | 8/1967 | Tolson . |
| 5,109,222 | 4/1992 | Welty . |
| 5,138,649 * | 8/1992 | Krisbergh et al. .................. 455/420 |
| 5,201,067 | 4/1993 | Grube et al. . |
| 5,335,276 | 8/1994 | Thompson et al. . |
| 5,450,438 * | 9/1995 | Landry et al. ....................... 375/222 |
| 5,491,831 | 2/1996 | Williams et al. . |
| 5,608,778 * | 3/1997 | Partridge, III ....................... 455/411 |
| 5,671,267 * | 9/1997 | August et al. .................. 1/1 |
| 5,739,748 * | 4/1998 | Flick ................................... 340/426 |
| 5,802,467 * | 9/1998 | Salazar et al. ...................... 455/420 |
| 5,909,183 * | 6/1999 | Borgstahl et al. .............. 340/825.22 |
| 5,963,624 * | 10/1999 | Pope ................................. 379/110.01 |
| 6,061,324 * | 5/2000 | Arai et al. ........................... 369/112 |
| 6,061,435 * | 5/2000 | Grundvig et al. .............. 379/102.03 |
| 6,161,005 * | 12/2000 | Pinzon ................................. 455/403 |
| 6,195,548 * | 2/2001 | Schultheiss ......................... 455/419 |
| 6,223,029 * | 4/2001 | Stenman et al. ..................... 455/420 |

FOREIGN PATENT DOCUMENTS

| | | | |
|---|---|---|---|
| 09037345 * | 2/1997 | (JP) | ............................... H04Q/7/38 |
| 94/01963 * | 1/1994 | (WO) . | |

* cited by examiner

*Primary Examiner*—Vivian Chang
*Assistant Examiner*—Charles N. Appiah
(74) *Attorney, Agent, or Firm*—Jenkens & Gilchrist

(57) ABSTRACT

A method and apparatus for effectuating unidirectional and bidirectional communication directly between a mobile telephone and another device without the use of a mobile telephone system to carry the communication. A communication path and a communication format are assigned to the mobile telephone and the device either through a fixed preassignment or dynamically by the mobile telephone system. The communication path constitutes a portion of a radio spectrum assigned to the mobile telephone system, and the communication format includes a modulation type and a communication protocol. The communication path is removed from a set of communication paths allocated for use by the mobile telephone system and the communication path and communication format are stored in separate memories located in the mobile telephone and the device. Controllers located within the mobile telephone and the device initiate communication directly between the mobile telephone and the other device on the assigned communication path using the assigned communication format.

21 Claims, 4 Drawing Sheets

SHORT DISTANCE COMMUNICATION AND REMOTE CONTROL CAPABILITY FOR MOBILE TELEPHONES

BACKGROUND OF THE INVENTION

1. Technical Field of the Invention

The present invention pertains in general to short distance communication for mobile telephones, and more particularly, to a method and apparatus for effectuating short distance bidirectional and unidirectional communication between a mobile telephone and another device without using a mobile serving telephone system to relay the communication.

2. Description of Related Art

Many products provide various forms of wireless communication. A first category of wireless devices, such as mobile telephones, cordless telephones, and two-way radios, provide bidirectional communication. A second category of devices, such as garage door openers, keyless entry systems for automobiles, and remote control devices for home entertainment equipment, provide unidirectional communication typically used for transmitting commands to remotely controlled devices. The second category further includes devices which perform unidirectional communication to transmit data. Such devices may include a computer to printer interface which allows a computer to transmit data to a printer or a personal organizer via wireless communication.

Many future applications are envisioned for wireless communication such as keyless access to buildings, automated teller machine interfaces, credit/debit card interfaces to point of sale equipment, and airport check-in facilitators among others. Also envisioned is the ability to provide short distance voice communication between a mobile telephone and either another mobile telephone or some other communication device without using a serving mobile telephone system infrastructure to relay the communication. Examples include communication between two mobile telephones, wherein, the mobile telephone users are family members located at a shopping mall or theme park or who are traveling in separate but proximate automobiles.

In most instances, each of the current and envisioned applications require the use of separate, different devices. It is desirable to combine some or all of communications features provided by these devices into a single unit. It would be advantageous if these features could be included into a mobile telephone. Due to the plethora of operating frequencies, data protocols, and modulation methods, however, such a device would be complex and expensive thereby making it impractical. It would be advantageous therefore, to devise a method and apparatus for effectuating wireless communication, as has been described, using a mobile telephone with little or no modification to the mobile telephone hardware. It would further be advantageous for such a method and apparatus to operate independent of the mobile telephone system infrastructure.

SUMMARY OF THE INVENTION

The present invention comprises a method and apparatus for effectuating unidirectional and bidirectional communication directly between a mobile telephone and another device without the use of a mobile telephone system to carry the communication. A mobile telephone refers hereinafter to any kind of radio communication equipment including, but not limited to, mobile stations, pagers, communicators and electronic organizers. In a first mode, the mobile telephone communicates in a conventional manner with the mobile telephone network. In a second mode, a communication path and a communication format are assigned to the mobile telephone and the device either through a fixed preassignment or dynamically assigned by the mobile telephone system. The assigned communication path constitutes a portion of a radio spectrum assigned to the mobile telephone system, and the communication format includes a modulation type and a communication protocol. The assigned communication path is removed from a set of communication paths allocated for use by the mobile telephone system and the communication path and communication format are stored in memories located in the mobile telephone and the device. The communication path can be removed from a single cell, a collection of cells or from the entire cellular telephone system. Controllers located within the mobile telephone and the device initiate communication directly between the mobile telephone and the other device on the assigned communication path and using the assigned communication format.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The present invention utilizes a communication path from a plurality of communication paths allotted to a mobile telephone system to effectuate communication between two mobile telephones or between a mobile telephone and some other device. According to the present invention, a mobile telephone system can be any kind of mobile wireless system such as a satellite mobile system or a Local Area Network (LAN) for data and/or voice communication. In an analog cellular telephone system a communication path comprises a radio frequency, in a Time Domain Multiple Access (TDMA) cellular telephone system a communication path comprises a specific time slot, and in other systems a communication path is the equivalent of a communication channel. According to the present invention it is also possible to utilize a part of a communication path in order to effectuate communication between two mobile telephones or between a mobile telephone and some other device. The present invention is not based on any particular mobile telephone system standard and is applicable to all mobile telephone systems. Communication is effectuated in the present invention in a manner such that the infrastructure of the mobile telephone system is never used as an intermediary to carry voice and/or data traffic between the mobile telephones or between the mobile telephone and the other device. Direct communication of voice and/or data, including remote control commands, bidirectionally between the mobile telephones or other device, or alternatively, unidirectionally from either the mobile telephone to the other device or from the other device to the mobile telephone over the communication paths normally allotted to the mobile telephone system with no involvement of the mobile telephone system and its related infrastructure is referred to herein, and for the purpose of distinctly claiming the invention, as a ▒point-to-point communication.▒

In addition to assigning the mobile telephone(s) and/or other device(s) the communication path over which to transmit, the present invention also provides for assigning a communication format to follow when communicating. The communication format includes a communication protocol involving such aspects as message size, message timing, and handshaking among others, and a technique for modulating an information signal on the communication path. The present invention allows the communication format, used to effectuate point-to-point communication, to either comply with, or deviate from, the mobile telephone system standard.

Following are examples of point-to-point communication. occurring in a manner compliant with the mobile telephone system standard. In an Advanced Mobile Phone Service (AMPS) system, point-to-point communication is effectuated on a frequency modulated carrier in a thirty kilohertz channel. In a Time Division Multiple Access (TDMA, D-AMPS) or Global System for Mobile communication (GSM) system, point-to-point communication is effectuated on a phase modulated carrier in a given time slot on a thirty kilohertz channel for D-AMPS and a two hundred kilohertz channel for GSM. In an Interim Standard 95 (IS-95) system, point-to-point communication is effectuated on a unique code assignment on a one million two hundred fifty thousand hertz channel.

Alternatively, point-to-point communication may deviate from the mobile telephone system standard. Deviation may occur in a variety of ways. For example, channel bandwidth may be exceeded or data rates can be either higher or lower than the standard. Furthermore, communication protocols or power levels may not comply with the standard. In a first example of a non-compliant manner for providing point-to-point communication, a communication path power output control, presently included in mobile telephones, is used to amplitude modulate a carrier frequency as a means for conveying the data and/or voice information. In a second example of a non-compliant manner for providing point-to-point communication, bursts of communication path energy are transmitted in a manner such that the duration of the bursts or the timing of one burst with respect to another subsequent burst is used to convey the data and/or voice information.

The present invention includes three approaches for assigning the communication path and the communication format used for point-to-point communication. A first approach is referred to as a fixed assignment, wherein, the assignment of the communication path and the communication format are preprogrammed into the mobile telephone (s) and other device(s) with no involvement by the mobile telephone system. The communication path and the communication format are preprogrammed in a variety ways. For example, the programming can occur at the time of manufacture or during first activation of the mobile telephone(s) and other device(s), wherein, the user selects from a menu of options. Programming can also be accomplished through connection of functional modules to the mobile telephone(s) and other device(s) containing the programming.

A second approach to assigning the communication path and the communication format is referred to as dynamic assignment. Using dynamic assignment, the mobile telephone system initially, and following the occurrence of certain events or the passage of a specified period of time, instructs the mobile telephone(s) and other device(s) as to which communication path and communication format to use. The instructions are transmitted using standard communication methods of the existing mobile telephone system. Use of dynamic assignment requires that the mobile telephone(s) and other device(s) be equipped to communicate with the mobile telephone system and to continually, periodically or on the occupance of an event such as power-up, initiation of a related action or at the direction of a user, monitor transmissions from the mobile telephone system for instructions containing communication path and communication format assignments.

Dynamic assignment allows greater flexibility in assigning the communication path and the communication format by allowing the mobile telephone system to allocate resources of the mobile telephone system for point-to-point communication based on current traffic patterns and load conditions experienced by the mobile telephone system. This allows the mobile telephone system to vary the assignments depending on a variety of factors, including, the time of day, day of the week, or geographic location of the mobile telephone(s) and other device(s) within the mobile telephone system, among others.

A third approach for assigning the communication path and the communication format used for point-to-point communication simply involves the use of both the fixed assignment and the dynamic assignment approaches previously described. In this approach, an assignment is preprogrammed into the mobile telephone(s) and other device(s) but is subsequently modified by the mobile telephone system using dynamic assignment.

Although dynamic assignment uses the mobile telephone system and its infrastructure to transmit communication path and communication format allocations, the mobile telephone system and its infrastructure is not used in either approach to carry voice and/or data traffic comprising the point-to-point communication. Furthermore, while fixed assignment may be used in any location, dynamic assignment may only be used in locations where mobile telephone service is available. Additionally, fixed and dynamic assignment may carry either bidirectional or unidirectional communication.

Interference between point-to-point communications and communications carried by the mobile telephone system is avoided by assigning separate communication paths for each type of communication. Interference between various point-to-point communications is avoided by maintaining low transmission power levels which are possible due to the short distance of the communication. Furthermore, more than one communication path may be assigned and used for separate point-to-point communications.

Figure 1:
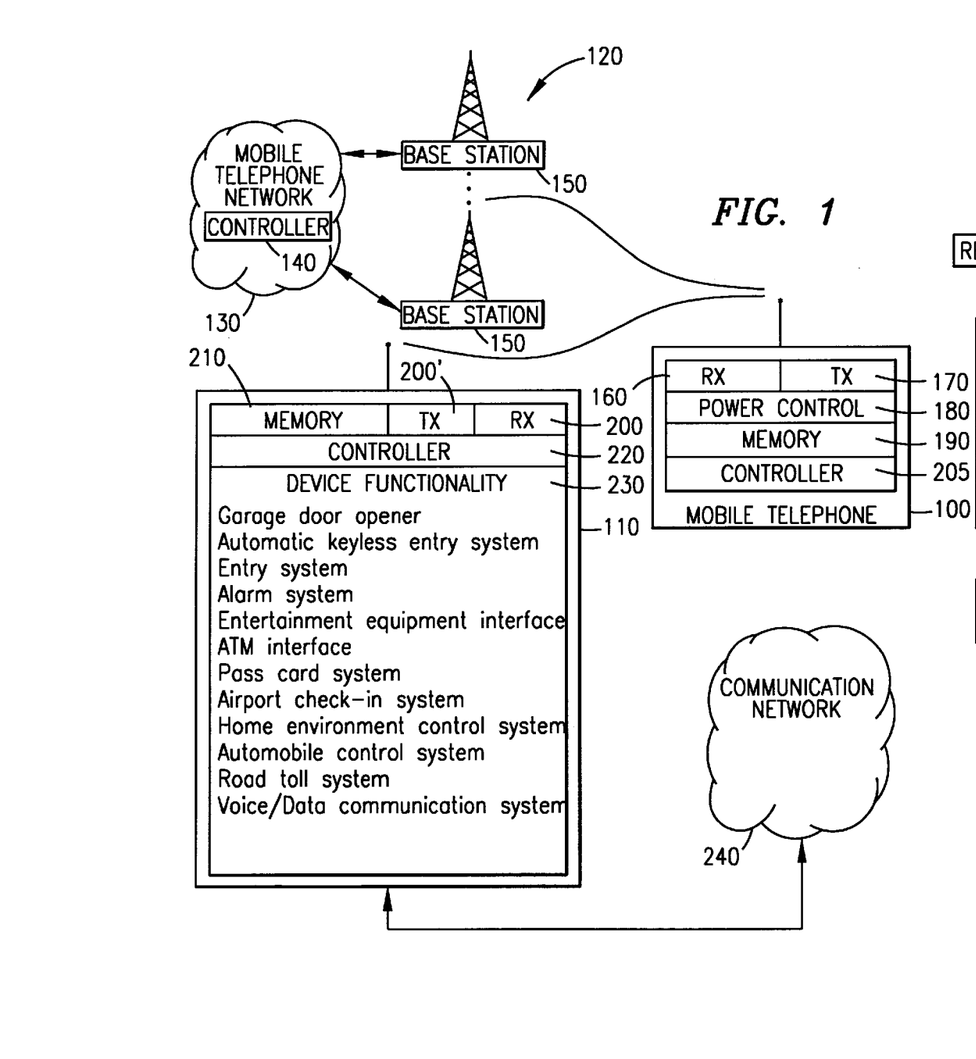
FIG. 1 is a functional block diagram of an embodiment of the present invention which provides unidirectional communication between a mobile telephone and another device, wherein, assignment of a communication path and a communication format for effectuating communication is fixed.

Referring now to FIG. 1, there is illustrated a functional block diagram of an embodiment of the present invention which provides unidirectional communication between a mobile telephone 100 and another device 110, wherein assignment of the communication path and the communication format are fixed. In this embodiment, a mobile telephone system 120 including a mobile telephone network 130, a controller 140, and a plurality of base stations 150 are allotted the plurality of communication paths over which to operate. The allotted communication paths include a set of communication paths which are allocated by the mobile; telephone system 120 to carry data, voice, control, and other mobile telephone system 120 traffic in a first conventional mode of operation. In addition to other functionality typically found in a mobile telephone, the mobile telephone 100 includes a receiver 160, a transmitter 170, a transmitter output power control 180, a memory 190, and a controller 205.

The device 110 which receives unidirectional transmissions from the mobile telephone 100 includes a receiver 200, a memory 210, a controller 220, and normal device functionality 230. Unidirectional point-to-point communication between the mobile telephone 100 and the device 110 in a second mode of operation carries any type of information including voice and/or data, but typically, the communication is a command to effectuate remote control over the device functionality 230. The controller 205 of the mobile telephone 100 communicates with the controller 220 of the device 110 by sending transmissions via the transmitter 170. The controller 220 of the device 110 receives the transmissions via the receiver 200. The transmitter 170 uses the modulation technique which is assigned to the mobile telephone 100. For example, to perform amplitude modulation the transmitter output power control 180 varies the output power of the transmitter 170 to produce an amplitude modulated signal.

The device 110 can be any device, but typically, is a remotely controlled device for controlling the device functionality 230 such as a garage door opener, a keyless entry system for an automobile, or a remote control device for home entertainment systems. The device 110 may also be connected to a communication network 240 to communicate with databases or other computing devices.

In this embodiment of the present invention, the communication path and the communication format are assigned with no intervention from the mobile telephone system 120. The communication path which is chosen for use in effectuating point-to-point communication is, however, removed by the mobile telephone system 120 service provider from the set of communication paths which are assigned by the mobile telephone system 120 to carry mobile telephone system 120 traffic. The communication path can be removed from a single cell, a collection of cells or from the entire cellular telephone system. The communication path and the communication format are initially assigned prior to any point-to-point communication, and while the assignment can be changed subsequent to the initial assignment, it is intended that the assignment remain fixed. More than one communication path and communication format may be assigned for point-to-point communication with multiple devices.

Assignment occurs in a variety of ways including, but not limited to, loading the communication path and the communication format into the memory 190 of the mobile telephone 100 and the memory 210 of device 110 during manufacturing, attaching the memories 190 and 210 as modules to the mobile telephone 100 and the device 110, or loading the memories 190 and 210 when registering the mobile telephone 100 and the device 110 for use. In any event, once the communication path and the communication format are loaded into the mobile telephone 100 and the device 110, they are not easily changed. This assignment technique is referred to as fixed assignment. Once the mobile telephone 100 and device 110 have been assigned the communication path and the communication format, the controller 205 is ready to send transmissions over the assigned communication path using the assigned communication format to device 110 via transmitter 170. Although the description of FIG. 1 describes unidirectional communication from the mobile telephone 100 to the device 110, unidirectional communication from the device 110 to the mobile telephone 100 can be effectuated by replacing the receiver 200 in the device 110 with a transmitter 200'. Assignment of the communication path and the communication format is accomplished by fixed assignment as has been described.

Figure 2:
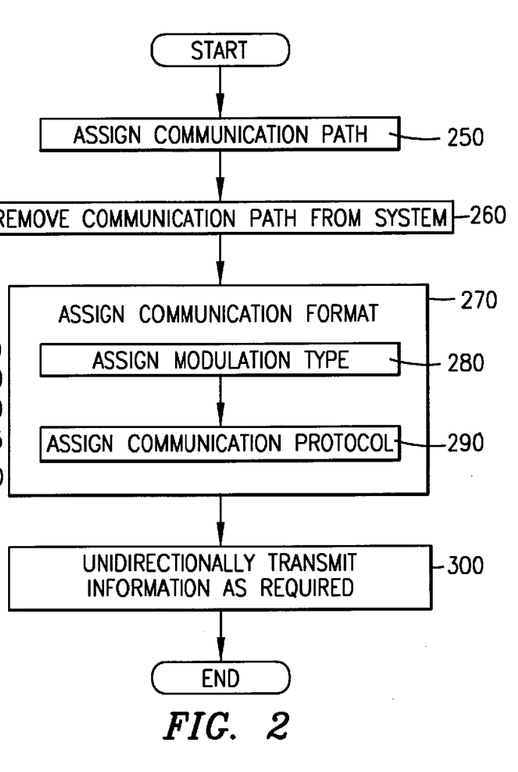
FIG. 2 is a flow diagram of a method for implementing the fixed assignment unidirectional communication apparatus described in FIG. 1.

Referring additionally now to FIG. 2, there is illustrated a flow diagram of a method for implementing the fixed assignment unidirectional communication apparatus described in FIG. 1. Prior to establishing unidirectional point-to-point communication between the mobile telephone 100 and device 110 or from the device 110 to the mobile telephone 100, the communication path is assigned to the mobile telephone 100 and device 110 from the set of communication paths allocated to carry mobile telephone system 120 traffic (step 250) in a first conventional mode of operation. The communication path, which is assigned for point-to-point communication, is removed by the mobile telephone system 120 service provider from the set of communication paths allocated to carry mobile telephone system 120 traffic (step 260). The communication path can be removed from a single cell, a collection of cells or from the entire cellular telephone system. The mobile telephone 100 and device 110 are also assigned the communication format (step 270) consisting of assigning the modulation type (step 280) and assigning the communication protocol (step 290) for operation in a second mode of operation. The communication path and the communication format are initially assigned prior to any point-to-point communication and while the assignment can be changed subsequent to the initial assignment, it is intended that the assignment remain fixed. More than one communication path and communication format may be assigned for point-to-point communication with multiple devices.

Assignment can occur in a variety of ways including, but not limited to, loading the communication path and the communication format into the memory 190 of the mobile telephone 100 and the memory 210 of device 110 during manufacturing, attaching the memories 190 and 210 as modules to the mobile telephone 100 and the device 110, or loading the memories 190 and 210 when registering the mobile telephone 100 and the device 110 for use. In any event, once the communication path and the communication format are loaded into the mobile telephone 100 and device 110, they are not easily changed. Once the communication path and the communication format are assigned, the mobile telephone 100 can transmit information including voice and/or data as required (step 300).

Figure 3:
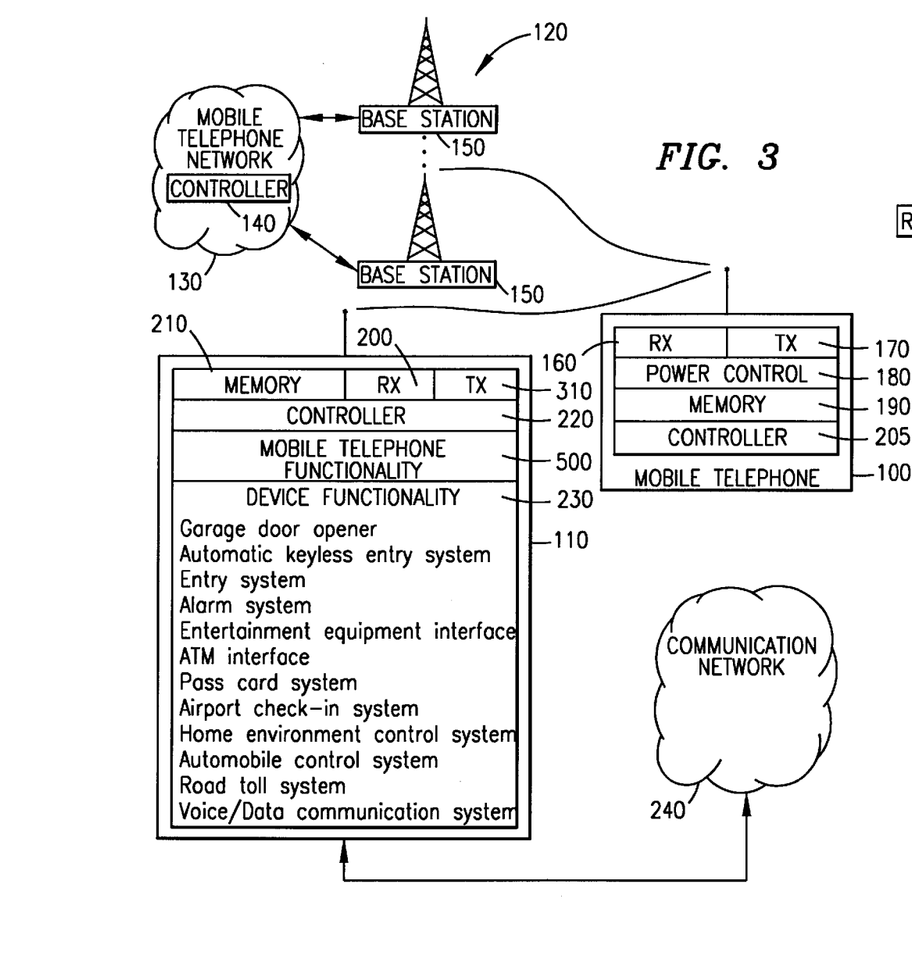
FIG. 3 is a functional block diagram of an embodiment of the present invention which provides bidirectional communication between a mobile telephone and another device, wherein, assignment of a communication path and a communication format for effectuating communication is fixed.

Referring additionally now to FIG. 3, there is illustrated a functional block diagram of an embodiment of the present invention which provides bidirectional communication between a mobile telephone 100 and another device 110, wherein assignment of the communication path and the communication format are fixed. In this embodiment, a mobile telephone system 120 including a mobile telephone network 130, a controller 140, and a plurality of base stations 150 are allotted the plurality of communication paths spectrum over which to operate in a first conventional mode of operation. The plurality of communication paths include a set of communication paths which are allocated by the mobile telephone system 120 to carry data, voice, control, and other mobile telephone system 120 traffic. In addition to other functionality typically found in a mobile telephone, the mobile telephone 100 includes a receiver 160, a transmitter 170, a transmitter output power control 180, a memory 190, and a controller 205.

The device 110 communicates bidirectionally with the mobile telephone 100 and includes a receiver 200, a transmitter 310, a memory 210, a controller 220, and normal device functionality 230. Bidirectional point-to-point communication between the mobile telephone 100 and the device 110 in a second mode of operation carries any type of information including voice and/or data. The controller 205 of the mobile telephone 100 and the controller 220 of the device 110 communicate by sending transmissions from the transmitter 170 to the receiver 200 and from the transmitter 310 to the receiver 160. The transmitters 170 and 310 use the modulation technique which is assigned to the mobile telephone 100 and the device 110. For example, to perform amplitude modulation, the transmitter output power control 180 of the mobile telephone 100 and the transmitter output power control of the device 110 located in the mobile telephone functionality 500 vary the output power of the transmitters 170 and 310 respectively to produce an amplitude modulated signal.

The device 110 can be any device having any device functionality 230 including, but not limited to, another mobile telephone for effectuating bidirectional communication between the two mobile telephones, a wireless interface between an Automated Teller Machine (ATM) and the mobile telephone 100 for effectuating ATM transactions, or a wireless interface between point of sale equipment and the mobile telephone 110 for effectuating electronic credit or debit transactions. The device 110 may also be connected to a communication network 240 to communicate with databases or other computing devices. The connection to the communication network 240 allows the device 110 and the device functionality 230 to access various databases and computing devices which may be required by the device functionality 230. For example, in the cases where the device 110 is an interface to an ATM or an interface to a point of sale equipment, the device functionality 230 uses the point-to-point communication of the present invention to request and receive subscriber account information stored in the memory 190 of the mobile telephone 100. This type of information is typically stored on a bank card or credit card. Once the device functionality 230 receives the subscriber information, the device functionality 230 requests and receives authorization to carry out the transaction from a financial institution, a database, or other authority via the communication network 240.

In this embodiment of the present invention, the communication path and the communication format are assigned with no intervention from the mobile telephone system 120. The communication path which is chosen for use in effectuating point-to-point communication is, however, removed by the mobile telephone system 120 service provider from the set of communication paths which are assigned by the mobile telephone system 120 to carry mobile telephone system 120 traffic. The communication path can be removed from a single cell, a collection of cells or from the entire cellular telephone system. The communication path and the communication format are initially assigned prior to any point-to-point communication, and while the assignment can be changed subsequent to the initial assignment, it is intended that the assignment remain fixed. More than one communication path and communication format may be assigned for point-to-point communication with multiple devices.

Assignment occurs in a variety of ways including, but not limited to, loading the communication path and the communication format into the memory 190 of the mobile telephone 100 and the memory 210 of device 110 during manufacturing, attaching the memories 190 and 210 as modules to the mobile telephone 100 and the device 110, or loading the memories 190 and 210 when registering the mobile telephone 100 and the device 110 for use. In any event, once the communication path and the communication format are loaded into the mobile telephone 100 and the device 110, they are not easily changed. This assignment technique is referred to as fixed assignment. Once the mobile telephone 100 and device 110 have been assigned the communication path and the communication format, bidirectional communication between the mobile telephone 100 and the device 110 can be initiated as needed.

Figure 4:
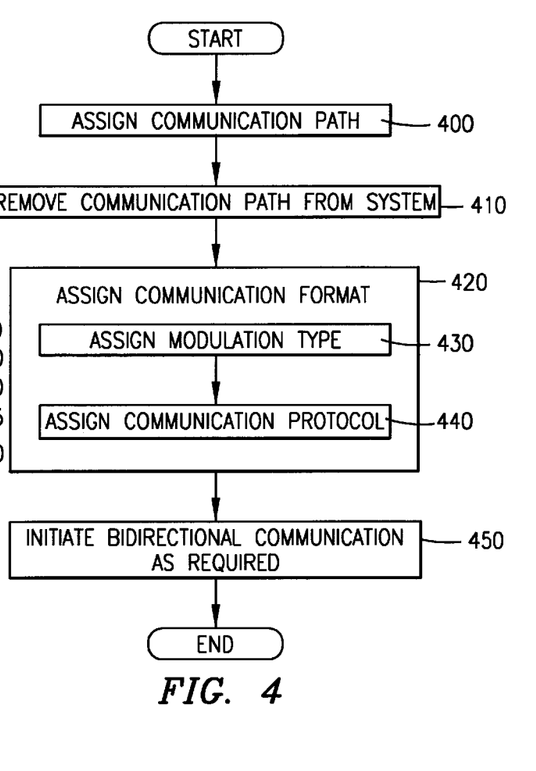
FIG. 4 is a flow diagram of a method for implementing the fixed assignment bidirectional communication apparatus described in FIG. 3.

Referring additionally now to FIG. 4, there is illustrated a flow diagram of a method for implementing the fixed assignment bidirectional communication apparatus described in FIG. 3. Prior to establishing bidirectional point-to-point communication between the mobile telephone 100 and device 110, the communication path is assigned to the mobile telephone 100 and device 110 from the set of communication paths allocated to carry mobile telephone system 120 traffic (step 400) in a first conventional mode of operation. The communication path, which is assigned for point-to-point communication, is removed by the mobile telephone system 120 service provider from the set of communication paths allocated to carry mobile telephone system 120 traffic (step 410) for operation in a second mode of operation. The communication path can be removed from a single cell, a collection of cells or from the entire cellular telephone system. The mobile telephone 100 and device 110 are also assigned the communication format (step 420) consisting of assigning the modulation type (step 430) and assigning the communication protocol (step 440). The communication path and the communication format are initially assigned prior to any point-to-point communication and while the assignment can be changed subsequent to the initial assignment, it is intended that the assignment remain fixed. More than one communication path and communication format may be assigned for point-to-point communication with multiple devices.

Assignment can occur in a variety of ways including, but not limited to, loading the communication path and the communication format into the memory 190 of the mobile telephone 100 and the memory 210 of device 110 during manufacturing, attaching the memories 190 and 210 as modules to the mobile telephone 100 and the device 110, or loading the memories 190 and 210 when registering the mobile telephone 100 and the device 110 for use. In any event, once the communication path and the communication format are loaded into the mobile telephone 100 and device 110, they are not easily changed. Once the communication path and the communication format are assigned, the mobile telephone 100 and the device 110 can initiate bidirectional transmission of information including voice and/or data as required (step 450).

Figure 5:
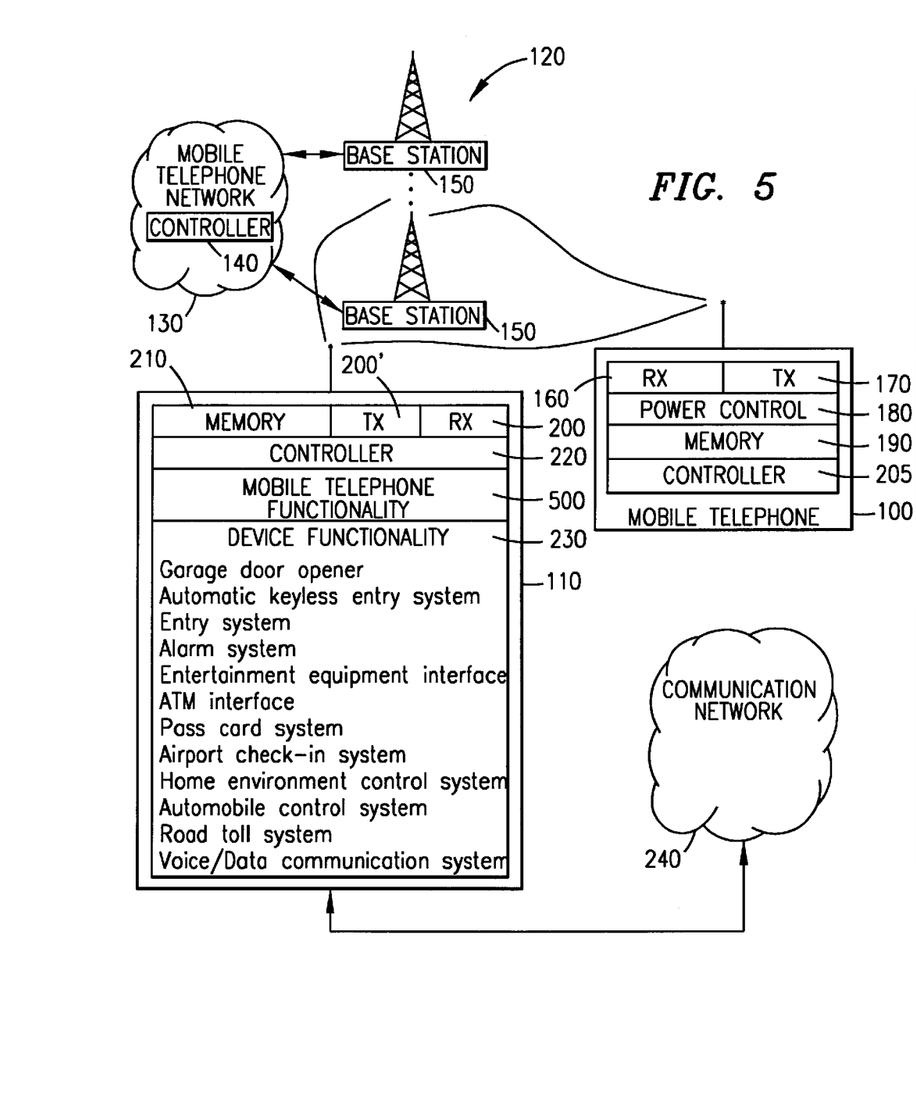
FIG. 5 is a functional block diagram of an embodiment of the present invention which provides unidirectional communication between a mobile telephone and another device, wherein, assignment of a communication path and a communication format for effectuating communication is dynamic.

Referring additionally now to FIG. 5, there is illustrated a functional block diagram of an embodiment of the present invention which provides unidirectional communication between a mobile telephone 100 and another device 110, wherein, assignment of the communication path and the communication format is dynamic. In this embodiment, a mobile telephone system 120 including a mobile telephone network 130, a controller 140, and a plurality of base stations 150 are allotted the plurality of communication paths over which to operate. The plurality of communication paths include a set of communication paths which are allocated by the mobile telephone system 120 to carry data, voice, control, and other mobile telephone system 120 traffic in a first conventional mode of operation. In addition to other functionality typically found in a mobile telephone, the mobile telephone 100 includes a receiver 160, a transmitter 170, a transmitter output power control 180, a memory 190, and a controller 205.

The device 110 which receives transmissions from the mobile telephone 100 includes a receiver 200, a memory 210, a controller 220, normal device functionality 230, and mobile telephone functionality 500 necessary for communicating with the mobile telephone system 120. Although the mobile telephone functionality 500 may include the entire functionality included in a mobile telephone such as a microphone, speaker and keypad, only that functionality which is necessary for communicating with the mobile telephone system 120 is necessary. Unidirectional point-to-point communication between the mobile telephone 100 and the device 110 in a second mode of operation carries any type of information including voice and/or data, but typically, the unidirectional communication is a command to remotely control the device functionality 230. The controller 205 of the mobile telephone 100 communicates with the controller 220 of the device 110 by sending transmissions via the transmitter 170. The controller 220 of the device 110 receives the transmissions via the receiver 200. The transmitter 170 uses the modulation technique which is assigned to the mobile telephone 100. For example, to perform amplitude modulation, the transmitter output power control 180 varies the output power of the transmitter 170 to produce an amplitude modulated signal.

The device 110 can be any device, but typically, is a remotely controlled device for controlling the device functionality 230 such as a garage door opener, a keyless entry system for an automobile, or a remote control device for home entertainment systems. The device 110 may also be connected to a communication network 240 to communicate with databases or other computing devices.

In this embodiment of the present invention, the communication path and the communication format are initially assigned to the mobile telephone(s) 100 and the device(s) 110 either by preprograming according to the fixed assignment described in FIG. 1 and FIG. 2 or by assignment from the mobile telephone system 120. To assign the communication path and the communication format, the controller 140 of the mobile telephone system 120 makes a selection from the set of communication paths allocated for use by the mobile telephone system 120. The selection can be based on any criteria including, but not limited to, the time of day, day of the week, or geographic location of the mobile telephone (s) and other device(s) within the mobile telephone system 120 among others. The mobile telephone system 120 also selects the communication format and assigns the communication path and the communication format by transmitting the selections to the mobile telephone 100 and the device 110. The mobile telephone 100 and the device 110 continually, periodically, or on the occurrence of an event such as power-up, initiation of a related action or at the direction of a user, monitors for transmissions from the mobile telephone system 120 containing the assignment. Once the communication path is selected for use in effectuating point-to-point communication, the communication path is removed by the mobile telephone system 120 from the set of communication paths which are assigned by the mobile telephone system 120 to carry mobile telephone system 120 traffic. The communication path can be removed from a single cell, a collection of cells or from the entire cellular telephone system 120. This assignment technique is referred to as dynamic assignment. Once the mobile telephone 100 and device 110 have assigned the communication path and the communication format, the controller 205 is ready to send a transmission over the assigned communication path using the assigned communication format to device 110 via transmitter 170.

Figure 6:
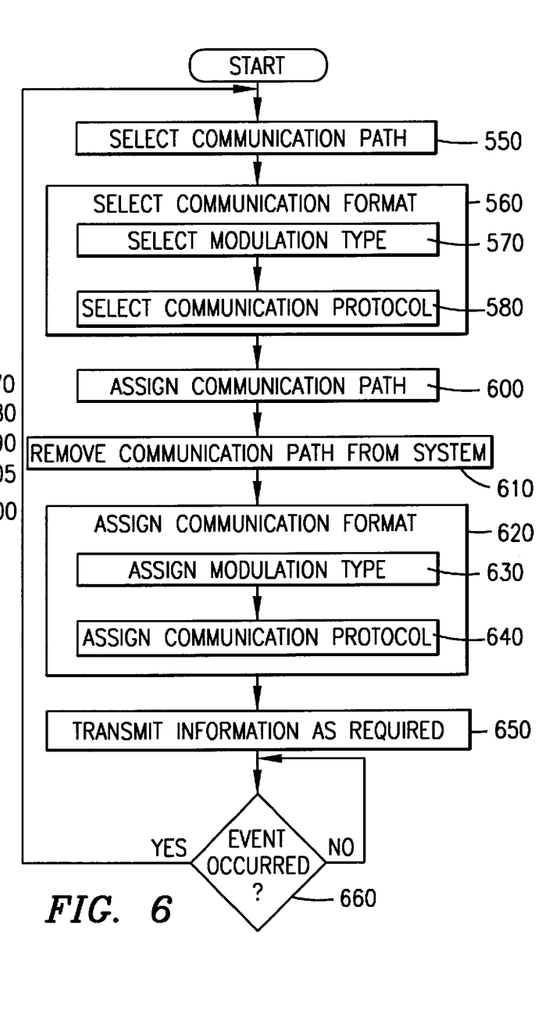
FIG. 6 is a flow diagram of a method for implementing the dynamic assignment unidirectional communication apparatus described in FIG. 5.

Although the description of FIG. 5 describes unidirectional communication from the mobile telephone 100 to the device 110, unidirectional communication from the device 110 to the mobile telephone 100 can be effectuated by replacing the receiver 200 in the device 110 with a transmitter 200'. Assignment of the communication path and the communication format is accomplished by fixed assignment Referring additionally now to FIG. 6, there is illustrated a flow diagram of a method for implementing the dynamic assignment unidirectional communication apparatus described in FIG. 5. The communication path and the communication format are initially assigned to the mobile telephone 100 and the device 110 prior to any point-to-point communication either by fixed assignment as described in FIG. 1 and FIG. 2 or may be assigned by the mobile telephone system 120. To assign the communication path and the communication format, the controller 140 of the mobile telephone system 120 selects the communication path from the set of communication paths allocated for use by the mobile telephone system 120 (step 550) in a first conventional mode of operation. The controller 140 of the mobile telephone system 120 also selects a communication format (step 560) by selecting a modulation type (step 570) and selecting a communication protocol (step 580). The selections can be based on any criteria including, but not limited to, the time of day, day of the week, or geographic location of the mobile telephone(s) and other device(s) within the mobile telephone system 120 among others. The mobile telephone system 120 assigns the communication path (step 600) by transmitting the selection to the mobile telephone 100 and the device 110. The communication path, which is assigned for point-to-point communication, is removed by the mobile telephone system 120 from the set of communication paths allocated to carry mobile telephone system 120 traffic (step 610). The communication path can be removed from a single cell, a collection of cells or from the entire cellular telephone system 120. The mobile telephone system 120 assigns the communication format (step 620) for operation in a second mode of operation, consisting of assigning the modulation type (step 630) and assigning the communication protocol (step 640), by transmitting the selection to the mobile telephone 100 and the device 110. Both the mobile telephone 100 and the device 110 are capable of receiving transmissions from the mobile telephone system 120 and continually, periodically, or the occurrence of an event such as power-up, initiation of a related action or at the direction of a user monitors for such transmissions. Once the communication path and the communication format are assigned, the mobile telephone 100 in the case of unidirectional communication from the mobile telephone 100 or the device 110 in the case of unidirectional communication from the device 110 to the mobile telephone 100 can transmit information including voice and/or data as required (step 650). The mobile telephone system 120 can assign a new communication path and communication format at any time, however, the mobile telephone 120 typically monitors for the occurrence of an event (step 660). The event can be anything such as the passage of a certain period of time, a human action such as the pressing of a button by a mobile telephone user or the existence of a certain load condition on the mobile telephone network 130. Whatever the event, the mobile telephone begins the selection process anew.

Figure 7:
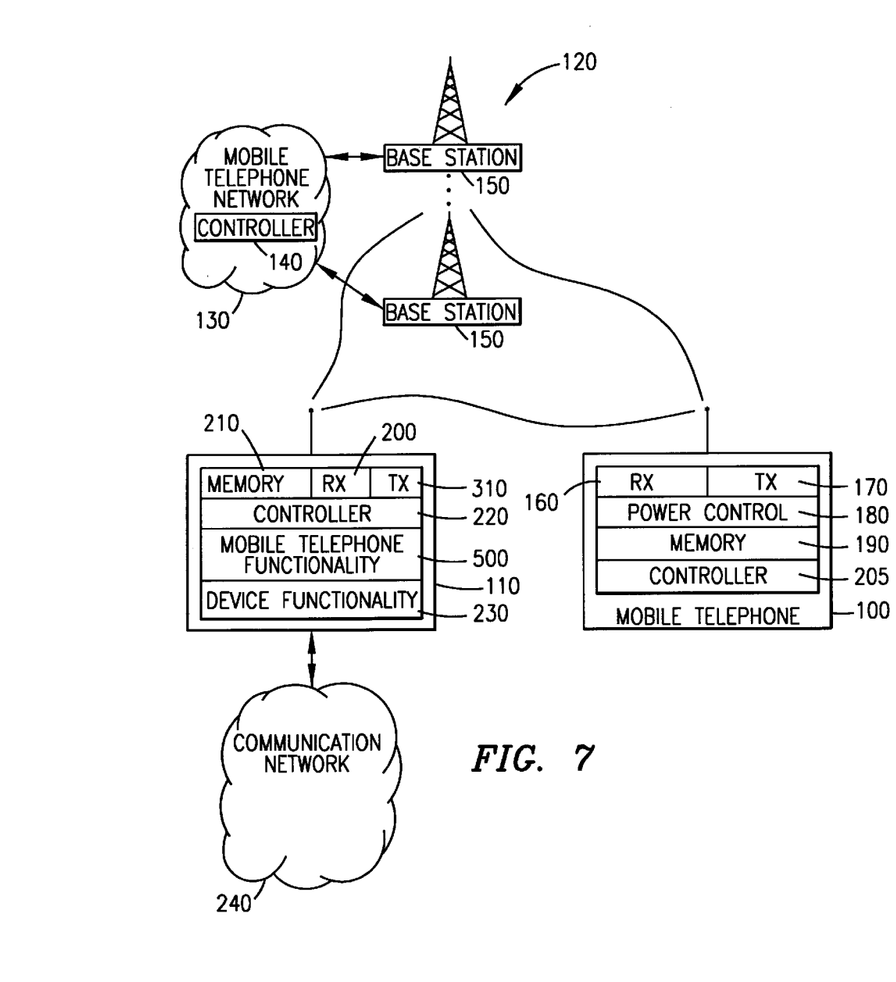
FIG. 7 is a functional block diagram of an embodiment of the present invention which provides bidirectional communication between a mobile telephone and another device, wherein, assignment of a communication path and a communication format for effectuating communication is dynamic.

Referring additionally now to FIG. 7, there is illustrated a functional block diagram of another embodiment of the present invention which provides bidirectional communication between a mobile telephone and another device, wherein, assignment of the communication path and the communication format is dynamic. In this embodiment, a mobile telephone system 120 including a mobile telephone network 130, a controller 140, and a plurality of base stations 150 are allotted the plurality of communication paths over which to operate in a first conventional mode of operation. The communication path is included in a set of communication paths which are allocated by the mobile telephone system 120 to carry data, voice, control, and other mobile telephone system 120 traffic. In addition to other functionality typically found in a mobile telephone, the mobile telephone 100 includes a receiver 160, a transmitter 170, a transmitter output power control 180, a memory 190, and a controller 205.

The device 110 communicates bidirectionally with the mobile telephone 100 and includes a receiver 200, a transmitter 310, a memory 210, a controller 220, and normal device functionality 230. Bidirectional point-to-point communication between the mobile telephone 100 and the device 110 in a second mode of operation carries any type of information including voice and/or data. The controller 205 of the mobile telephone 100 and the controller 220 of the device 110 communicate by sending transmissions from the transmitter 170 to the receiver 200 and from the transmitter 310 to the receiver 160. The transmitters 170 and 310 use the modulation technique which is assigned to the mobile telephone 100 and the device 110. For example, to perform amplitude modulation, the transmitter output power control 180 of the mobile telephone 100 and the transmitter output power control of the device 110 located in the mobile telephone functionality 500 vary the output power of the transmitters 170 and 310 respectively to produce an amplitude modulated signal.

The device 110 can be any device having any device functionality 230 including, but not limited to, another mobile telephone for effectuating bidirectional communication between the two mobile telephones, a wireless interface between an Automated Teller Machine (ATM) and the mobile telephone 100 for effectuating ATM transactions, or a wireless interface between point of sale equipment and the mobile telephone 110 for effectuating electronic credit or debit transactions. The device 110 may also be connected to a communication network 240 to communicate with databases or other computing devices. The connection to the communication network 240 allows the device 110 and the device functionality 230 to access various databases and computing devices which may be required by the device functionality 230. For example, in the cases where the device 110 is an interface to an ATM or an interface to a point of sale equipment, the device functionality 230 uses the point-to-point communication of the present invention to request and receive subscriber account information stored in the memory 190 of the mobile telephone 100. This type of information is typically stored on a bank card or credit card. Once the device functionality 230 receives the subscriber information, the device functionality 230 requests and receives authorization to carry out the transaction from a financial institution, a database, or other authority via the communication network 240.

In this embodiment of the present invention, the communication path and the communication format are initially assigned to the mobile telephoners) 100 and the device(s) 110 either by preprograming according to the fixed assignment describe in FIG. 1 and FIG. 2 or by assignment from the mobile telephone system 120. To assign the communication path and the communication format, the controller 140 of the mobile telephone system 120 makes a selection from the set of communication paths allocated for use by the mobile telephone system 120. The selection can be based on any criteria including, but not limited to, the time of day, day of the week, or geographic location of the mobile telephone (s) and other device(s) within the mobile telephone system 120 among others. The mobile telephone system 120 also selects the communication format and assigns the communication path and the communication format by transmitting the selections to the mobile telephone 100 and the device 110. The mobile telephone 100 and the device 110 continually, periodically, or on the occurrence of an event such as power-up, initiation of a related action or at the direction of a user, monitors for transmissions from the mobile telephone system 120 containing the assignment. Once the communication path is selected for use in effectuating point-to-point communication, the communication path is removed by the mobile telephone system 120 from the set of communication paths which are assigned by the mobile telephone system 120 to carry mobile telephone system 120 traffic. The communication path can be removed from a single cell, a collection of cells or from the entire cellular telephone system 120. This assignment technique is referred to as dynamic assignment. Once the mobile telephone 100 and device 110 have assigned the communication path and the communication format, the controller 205 is ready to send transmissions over the assigned communication path using the assigned communication format to device 110 via transmitter 170.

Figure 8:
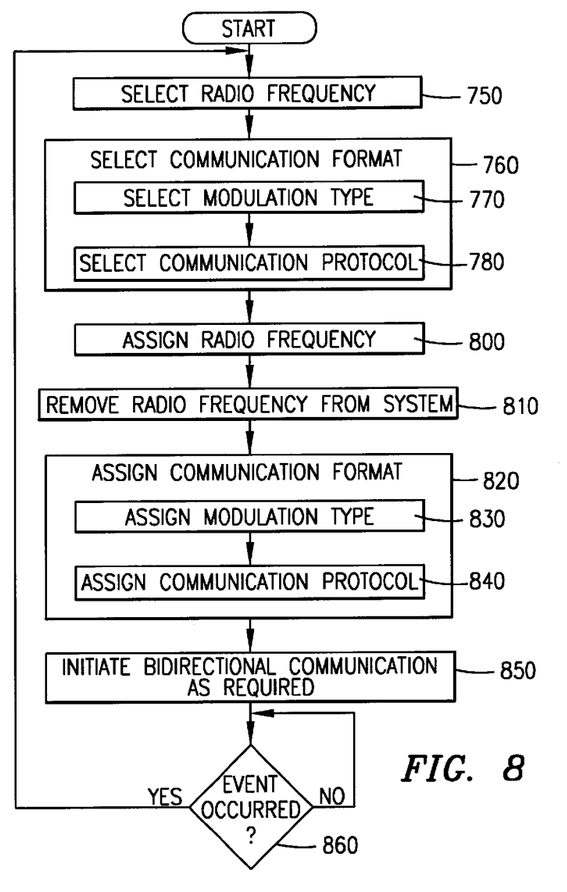
FIG. 8 is a flow diagram of a method for implementing the dynamic assignment bidirectional communication apparatus described in FIG. 7.

Referring additionally now to FIG. 8, there is illustrated a flow diagram of a method for implementing the dynamic assignment bidirectional communication apparatus described in FIG. 7. The communication path and the communication format are initially assigned to the mobile telephone 100 and the device 110 prior to any point-to-point communication either by fixed assignment as described in FIG. 1 and FIG. 2 or may be assigned by the mobile telephone system 120. To assign the communication path and the communication format, the controller 140 of the mobile telephone system 120 selects the communication path from the set of communication paths allocated for use by the mobile telephone system 120 (step 750) in a first conventional mode of operation. The controller 140 of the mobile telephone system 120 also selects a communication format (step 760) by selecting a modulation type (step 770) and selecting a communication protocol (step 780) for operation in a second mode of operation. The selections can be based on any criteria including, but not limited to, the time of day, day of the week, day of the week, or geographic location of the mobile telephone(s) and other device(s) within the mobile telephone system 120 among others. The mobile telephone system 120 assigns the communication path (step 800) by transmitting the selection to the mobile telephone 100 and the device 110. The communication path, which is assigned for point-to-point communication, is removed by the mobile telephone system 120 from the set of communication paths allocated to carry mobile telephone system 120 traffic (step 810). The communication path can be removed from a single cell, a collection of cells or from the entire cellular telephone system 120. The mobile telephone system 120 assigns the communication format (step 820), consisting of assigning the modulation type (step 830) and assigning the communication protocol (step 840), by transmitting the selection to the mobile telephone 100 and the device 110. Both the mobile telephone 100 and the device 110 are capable of receiving transmissions from the mobile telephone system 120 and continually, periodically, or on the occurrence of an event such as power-up, initiation of a related action or at the direction of a user, monitors for such transmissions. Once the communication path and the communication format are assigned, the mobile telephone 100 and the device 110 can communicate by transmitting information including voice and/or data as required (step 850). The mobile telephone system 120 can assign a new communication path and communication format at any time, however, the mobile telephone system 120 typically monitors for the occurrence of an event (step 860). The event can be anything such as the passage of a certain period of time or the existence of a certain load condition on the mobile telephone 130. Whatever the event, the mobile telephone begins the selection process anew.

Embodiments of the present invention have been described which effectuate unidirectional communication either from the mobile telephone to another device or from the device to the mobile telephone, wherein, both the communication path and the communication format are assigned by either fixed or dynamic allocation. Similarly, embodiments of the present invention have been described which effectuate bidirectional communication between the mobile telephone and the other device, wherein, both the communication path and the communication format are assigned by either fixed or dynamic allocation. These embodiments are provided by way of example and are not intended to be an exhaustive list of possible embodiments. Thus, the present invention encompasses embodiments, wherein, the mobile telephone is assigned a communication path via fixed or dynamic assignment, the mobile telephone is assigned a communication format via fixed or dynamic assignment, the device is assigned a communication path via fixed or dynamic assignment, and the device is assigned a communication format via fixed or dynamic assignment in any combination. Furthermore, the assignment of the communication path and communication format for both the mobile telephone and the other device can include a fixed and dynamic assignment, wherein, the communication path or communication format is initially assigned by fixed assignment and is subsequently modified using dynamic assignment.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for effectuating unidirectional point-to-point communication comprising the steps of:

assigning a communication path to a mobile telephone and a remote device, other than a mobile telephone, wherein the communication path constitutes a portion of a radio spectrum assigned to a mobile telephone system;

removing the communication path from a set of communication paths allocated for use by the mobile telephone system;

selecting a communication format;

transmitting, over the mobile telephone system, information identifying the communication format to the mobile telephone and the remote device;

transmitting a remote control command by the mobile telephone in a point-to-point communication to the remote device on the assigned communication path using the assigned communication format; and performing, within the remote device, non-telephony functionality responsive to said remote control command transmitted from the mobile telephone.

2. The method recited in claim 1, wherein the step of assigning the communication format comprises the step of selecting a communication format from a set of predefined communication formats.

3. The method recited in claim 1, wherein the step of assigning the communication format further comprises the steps of:

assigning a modulation type for modulating a radio signal on the assigned communication path; and assigning a communication protocol for effectuating point-to-point communication between the mobile telephone and the remote device.

4. The method recited in claim 1, wherein the step of assigning a communication path comprises the steps of:

(a) selecting a communication path from the set of communication paths allocated for use by the mobile telephone system; and (b) transmitting, over the mobile telephone system, information identifying the communication path to the mobile telephone and the remote device.

5. The method recited in claim 4, further including the step of repeating steps (a) and (b).

6. The method recited in claim 4, further including the step of repeating steps (a) and (b) whenever a predefined event occurs.

7. The method recited in claim 1, wherein the step of performing non-telephony functionality includes at least one of the following:

performing a keyless entry command with respect to a security related functionality, performing a control command with respect to a control-specific related functionality, performing activation/deactivation commands with respect to an authorization related functionality, performing a registration command with respect to an authorization related functionality, or performing an automatic entry command with respect to an authorization related functionality.

8. The method recited in claim 1, wherein the performed non-telephony functionality includes at least one of the following:

garage door functionality, keyless entry system functionality, automatic entry system functionality, alarm system functionality, entertainment equipment interface functionality, home environment control system functionality, automobile control system functionality, airport check-in functionality, pass card system functionality, and road toll system functionality.

9. A method for effectuating bidirectional point-to-point communication comprising the steps of:

assigning a communication path to a mobile telephone and a remote device, other than mobile telephone, wherein the communication path constitutes a portion of a radio spectrum assigned to a mobile telephone system;

removing the communication path from a set of communication paths allocated for use by the mobile telephone system;

selecting a communication format;

transmitting, over the mobile telephone system, information identifying the communication format to the mobile telephone and the remote device;

initiating transmission of bidirectional point-to-point communication between the mobile telephone and the remote device on the assigned communication path using the assigned communication format; and performing, within the remote device, non-telephony functionality responsive to said bidirectional point-to-point communication with the mobile telephone.

10. The method recited in claim 9, wherein the step of assigning the communication format comprises the step of selecting a communication format from a set of predefined communication formats.

11. The method recited in claim 9, wherein the step of assigning the communication format further comprises the steps of:

assigning a modulation type for modulating a radio signal on the assigned communication path; and assigning a communication protocol for effectuating point-to-point communication between the mobile telephone and the remote device.

12. The method recited in claim 9, wherein the step of assigning a communication path comprises the steps of:

(a) selecting a communication path from the set of communication paths allocated for use by the mobile telephone system; and (b) transmitting, over the mobile telephone system, information identifying the communication path to the mobile telephone and the remote device.

13. The method recited in claim 12, further including the step of repeating steps (a) and (b).

14. The method recited in claim 12, further including the step of repeating steps (a) and (b) whenever a predefined event occurs.

15. The method recited in claim 9, wherein the step of performing non-telephony functionality includes at least one of the following:

communicating with a database or other computing device, executing a monetary banking operation with respect to an account management related functionality, or executing credit/debit card purchase operations with respect to an authorization related functionality.

16. The method recited in claim 9, wherein the performed non-telephony functionality includes at least one of the following:

Automatic Teller Machine (ATM) interface functionality, point-of-sale equipment interface functionality, and data communication system functionality.

17. A dual communication mode mobile telephone comprising:

a first communication mode for effectuating communication with a mobile telephone network using the communication paths and communication format of the mobile telephone network; and a second communication mode for unidirectional point-to-point communication with a remote device, other than a mobile telephone, using a communication path and communication format wherein the communication path constitutes a portion of the radio spectrum assigned to the mobile telephone network the unidirectional point-to-point communication comprising a non-telephony remote control command for effectuating remote control over the remote device functionality, and wherein the communication format for effectuating the point-to-point communication is selectable by the mobile telephone network and communicated to the mobile telephone and the remote device via the first communication mode.

18. The mobile telephone recited in claim 17, wherein the communication path for effectuating the point-to-point communication is selectable by the mobile telephone system and communicated to the mobile telephone and the remote device via the first communication mode.

19. A dual communication mode mobile telephone comprising:

a first communication mode for effectuating communication with a mobile telephone network using the communication paths and communication format of the mobile telephone network; and a second communication mode for effectuating bidirectional point-to-point communication with a remote device, other than a mobile telephone, using a predefined communication path and communication format wherein the communication path constitutes a portion of the radio spectrum assigned to the mobile telephone network, the bidirectional point-to-point communication comprising information for effectuating non-telephony related operations between the mobile telephone and the remote device, and wherein the communication format for effectuating the point-to-point communication is selectable by the mobile telephone network and communicated to the mobile telephone and the remote device via the first communication mode.

20. The mobile telephone recited in claim 19, wherein the communication path for effectuating the point-to-point communication is selectable by the mobile telephone system and communicated to the mobile telephone and the device via the first communication mode.

21. A mobile telephone system comprising:

a first communication mode for effectuating communication between a mobile telephone and a mobile telephone network; and a second communication mode for effectuating bidirectional point-to-point communication between a remote device, other than a mobile telephone, and the mobile telephone using a predefined communication path and communication format wherein the communication path constitutes a portion of the radio spectrum assigned to the mobile telephone network, the bidirectional point-to-point communication comprising information for controlling the effectuation of non-telephony related operations between the mobile telephone and the remote device, and wherein the communication format for effectuating the point-to-point communication is selectable by the mobile telephone network and communicated to the mobile telephone and the remote device via the first communication mode.

* * * * *

UNITED STATES PATENT AND TRADEMARK OFFICE
CERTIFICATE OF CORRECTION

PATENT NO.    : 6,295,448 B1
DATED         : September 25, 2001
INVENTOR(S)   : John Joseph Hayes, Jr. et al.

It is certified that error appears in the above-identified patent and that said Letters Patent is hereby corrected as shown below:

<u>Title page,</u>
Item [56], U.S. PATENT DOCUMENTS, add -- 5,113,427   5/1992   Ryoichi et al. --

<u>Column 12,</u>
Line 25, delete "telephoners)" replace with -- telephone(s) --

Signed and Sealed this

Second Day of July, 2002

Attest:

Attesting Officer

JAMES E. ROGAN
Director of the United States Patent and Trademark Office